US012182478B2

(12) United States Patent
Trim et al.

(10) Patent No.: US 12,182,478 B2
(45) Date of Patent: Dec. 31, 2024

(54) DETERMINING OPTIMAL SIZE AND SHAPE OF ADDITIVE MANUFACTURED PACKAGING

(71) Applicant: International Business Machines Corporation, Armonk, NY (US)

(72) Inventors: Craig M. Trim, Ventura, CA (US); Martin G. Keen, Cary, NC (US); Michael Bender, Rye Brook, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 16/556,291

(22) Filed: Aug. 30, 2019

(65) Prior Publication Data

US 2021/0064709 A1 Mar. 4, 2021

(51) Int. Cl.
*G06F 30/00* (2020.01)
*B29C 64/386* (2017.01)
*B33Y 50/00* (2015.01)
*G06F 113/20* (2020.01)
*G06T 7/00* (2017.01)

(52) U.S. Cl.
CPC ............ *G06F 30/00* (2020.01); *B29C 64/386* (2017.08); *B33Y 50/00* (2014.12); *G06T 7/0006* (2013.01); *G06F 2113/20* (2020.01)

(58) Field of Classification Search
CPC ...... G06F 30/00; G06F 30/20; G06F 2113/20; G06F 30/10; G06F 30/12; G06F 2113/10; G06F 30/25; G06F 30/27; G06F 30/28; B33Y 50/00; B33Y 50/02; B29C 64/386; B29C 64/393; G06T 7/0006
See application file for complete search history.

(56) References Cited

U.S. PATENT DOCUMENTS 10,169,735 B2 * 1/2019 Lund ......................... B64F 5/10
10,627,244 B1 * 4/2020 Lauka ................ G01C 21/3623
2002/0162771 A1 * 11/2002 Van Wagenen ...... B65D 75/245
206/775

(Continued)

FOREIGN PATENT DOCUMENTS

KR 101655024 B1 9/2016

OTHER PUBLICATIONS

Lim, Mijin, et al. "Highly-enhanced water resistant and oxygen barrier properties of cross-linked poly (vinyl alcohol) hybrid films for packaging applications." Progress in Organic Coatings 85 (2015): 68-75. (Year: 2015).*

(Continued)

*Primary Examiner* — Michael Edward Cocchi
(74) *Attorney, Agent, or Firm* — Stephen R. Yoder (57) ABSTRACT

In an approach to determining the optimal size and shape of additive manufactured packaging, a delivery location corpus, a storage location corpus, and a transportation mechanism corpus are received. A notification to design a package for an item is received. The optimal design attributes are determined for the delivery location. The optimal design attributes are determined for the storage location. The optimal design attributes are determined for the transportation mechanism. The additive manufactured packaging for the item is designed based on the optimal design attributes for the delivery location, the storage location, and the transportation mechanism.

19 Claims, 3 Drawing Sheets

(56) References Cited

U.S. PATENT DOCUMENTS

| | | | |
|---|---|---|---|
| 2015/0096266 A1* | 4/2015 | Divine | G05B 19/4099 53/558 |
| 2015/0145158 A1 | 5/2015 | Levine | |
| 2015/0197063 A1 | 7/2015 | Shinar | |
| 2016/0280403 A1 | 9/2016 | Colson | |
| 2017/0004552 A1* | 1/2017 | Hassman | G06Q 10/1095 |
| 2017/0011340 A1* | 1/2017 | Gabbai | G06Q 10/08355 |
| 2017/0253401 A1 | 9/2017 | Bouthillier | |
| 2017/0341795 A1* | 11/2017 | Colson | B65B 57/00 |
| 2018/0096175 A1 | 4/2018 | Schmeling | |
| 2018/0106133 A1* | 4/2018 | Bolchover | E21B 41/00 |
| 2018/0208336 A1* | 7/2018 | Colson | G05B 19/4099 |
| 2020/0116493 A1* | 4/2020 | Colburn | G06F 18/253 |
| 2020/0324482 A1* | 10/2020 | Taig | G06F 30/00 |

OTHER PUBLICATIONS

"Global soft drink firms back plan to eliminate packaging waste," The Guardian, Sep. 6, 2018, <https://www.theguardian.com/environment/2018/sep/06/global-soft-drink-firms-back-plan-to-eliminate-packaging-waste>, 3 pages.

Alderighi et al., "Metamolds: Computational Design of Silicone Molds", https://repository.ist.ac.at/1038/1/metamolds_authorversion.pdf, ACM Trans. Graph., vol. 37, No. 4, Article 136. Publication date: Aug. 2018, 13 pages.

Jovic, Martja "How 3D Printing Is Disrupting the Packaging Industry", Prescouter, Feb. 2017, <https://www.prescouter.com/2017/02/3d-printing-disrupting-packaging/>, 4 pages.

Karydes, Megy, "The Future of Take-out Exhibit: How We Can Eliminate Packaging Waste", Forbes, May 23, 2018, <https://www.forbes.com/sites/megykarydes/2018/05/23/the-future-of-take-out-exhibit-how-we-can-eliminate-packaging-waste/>, 4 pages.

Watkin, Hannah, "Researchers Optimize Silicone Mold Fabrication with 3D Printed Metamolds", <https://all3dp.com/4/researchers-automate-the-process-of-creating-silicone-molds-with-3d-printed-metamolds/>, Sep. 7, 2018, 6 pages.

"Eliminate or Minimize Unnecessary Packaging", Rethink Recycling, Captured Mar. 8, 2019, 1 pages, <http://www.rethinkrecycling.com/how-reduce-shipping-materials/eliminate-or-minimize-unnecessary-packaging>.

* cited by examiner

DETERMINING OPTIMAL SIZE AND SHAPE OF ADDITIVE MANUFACTURED PACKAGING

BACKGROUND

The present invention relates generally to the field of product packaging, and more particularly to determining optimal size and shape of additive manufactured packaging.

Additive manufacturing is defined as the process of joining materials to make objects from 3D model data, usually layer upon layer, as opposed to subtractive manufacturing methodologies, where material is removed to make the object. Additive manufacturing now defines a large branch of industrial systems for creating new parts and products. The most common form of additive manufacturing today is 3D printing. Additive manufacturing, and especially 3D printing, is increasingly being adopted for packaging needs. Additive manufacturing can offer the user customized packaging of their own design. Additive manufacturing of packaging can determine the shape of a package and how easily it can be stacked or coupled with other packages.

SUMMARY

Embodiments of the present invention disclose a method, a computer program product, and a system for determining optimal size and shape of additive manufactured packaging. In one embodiment, a delivery location corpus, a storage location corpus, and a transportation mechanism corpus are received. A notification to design a package for an item is received. The optimal design attributes are determined for the delivery location. The optimal design attributes are determined for the storage location. The optimal design attributes are determined for the transportation mechanism. The additive manufactured packaging for the item is designed based on the optimal design attributes for the delivery location, the storage location, and the transportation mechanism.

DETAILED DESCRIPTION

Many businesses use considerably more packaging than is necessary and these businesses can greatly reduce packaging costs by analyzing their packaging needs. Excessive or unnecessary packaging of an item occurs simply because a business does not reevaluate their packaging needs as their products change or as new packaging technology becomes available. A business can often find that reevaluating its transport packaging system and eliminating unnecessary packaging results in both reduced material purchase and the ability to include a greater amount of product in each shipment. There are many instances where a company's products can be shipped in bulk, thereby reducing overall packaging costs, including the cost of labor to assemble the package, insert the product, and close the package as well as the costs of the materials used to close the packaging, such as tape or glue.

Additive manufacturing, especially 3D printing, is increasingly being adopted for packaging needs. Embodiments of the present invention improve current packaging technology by customizing a packaging based on specific delivery, storage, and transportation information. For example, the present invention can determine the optimal shape of a package for the desired delivery or storage location, and how easily it can be stacked or coupled with other packages for optimal storage or transportation. Embodiments of the present invention can be applied for practical use by a package delivery company that has specific bays within its trucks that are reserved for overnight delivery packages. Those specific bays are further limited based on the delivery company having three different truck types. Further, the supplier has instructed that the products are extremely fragile (e.g., glass blown art work), and therefore, a fragileness factor needs to be determined to ensure that the product is not broken during delivery. The present invention designs an additive manufactured package based on the specifications of the bays in the delivery company's trucks and the fragileness factor from the supplier.

The present invention is a method, computer program product, and system to design a custom additive manufactured package where the optimal design attributes are determined based on the delivery location, the storage location, and the transportation mechanism for the item to be packaged. The optimal design attributes include, but are not limited to, the physical dimensions, i.e., length, width, and height; the physical shape; the ability to stack with other packages; and the ability to connect to, or couple with, other packages. The present invention determines a set of optimal design attributes for the delivery location, a set of optimal design attributes for the storage location, and a set of optimal design attributes for the transportation mechanism. The separate sets of optimal design attributes are combined with a fragileness factor for the item to be packaged, as well as any other factors supplied by the user. In an embodiment, the fragileness factor of the item may be based on the item specification as described by the manufacturer, implicitly defined by the user, or may be defined by an industry group that is responsible for defining the shipping requirements for the type of item to be packaged.

In an embodiment, the fragileness factor may be adjusted based on the cost of the item to be packaged where, for example, a high cost item may receive a fragileness factor greater than the fragileness factor for a similar, but lower cost, item. In an embodiment, the fragileness factor may be adjusted based on the ability to return the item to the supplier. For example, many suppliers prefer not to accept returns on products incorporating lithium ion batteries due to the inherent danger in shipping these batteries. In such a case, the fragileness factor is increased to reduce the probability that the product would be damaged in shipping and therefore need to be returned.

In an embodiment, the fragileness factor may be adjusted based on the predicted weather during the shipment of the item. For example, if heavy rain or snow is predicted at the time the item is to be delivered, the fragileness factor may be adjusted to provide a more dense, water-tight package. In an embodiment, the fragileness factor may be adjusted based on the distance of the shipment. For example, if the distance of the shipment will require several hops from one carrier hub to another, the fragileness factor may be increased due to the additional handling the package will receive.

Finally, a weighting factor, either supplied by the user or, if none is supplied, a system default weighting factor, is applied to these separate sets of optimal design attributes and factors to determine the final optimal design attributes. The package is then designed based on the final optimal design attributes, and is manufactured using an additive manufacturing process chosen by the user.

Figure 1:
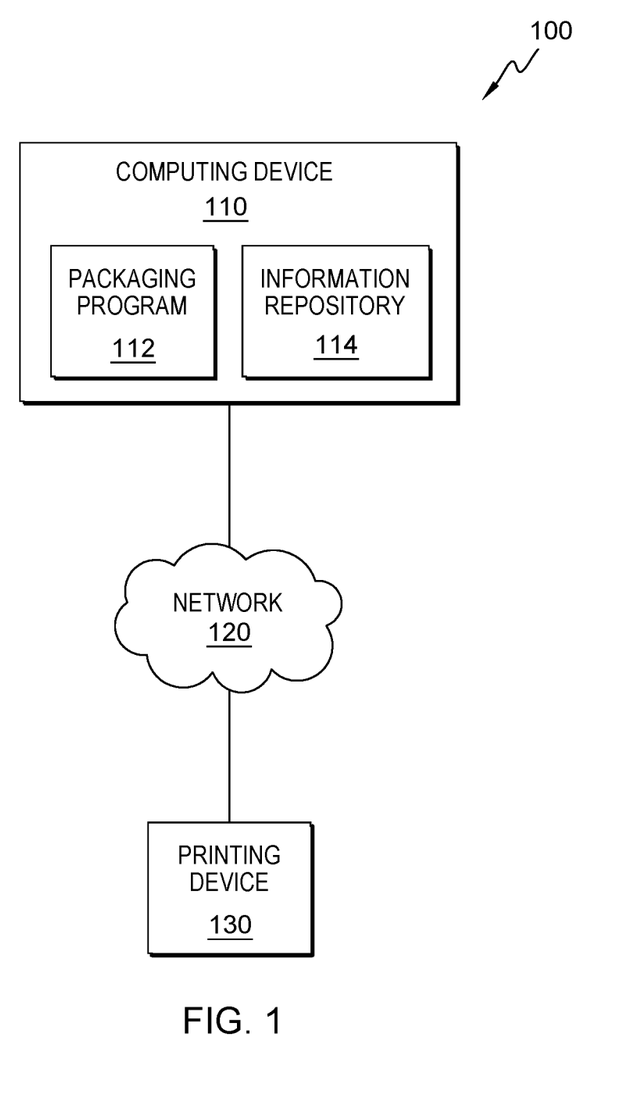
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of packaging program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and printing device 130, both connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, printing device 130, and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes packaging program 112. In an embodiment, packaging program 112 is a program, application, or subprogram of a larger program for determining optimal size and shape of additive manufactured packaging. In an alternative embodiment, packaging program 112 may be located on any other device accessible by computing device 110 via network 120.

In an embodiment, computing device 110 includes information repository 114. In an embodiment, information repository 114 may be managed by packaging program 112. In an alternate embodiment, information repository 114 may be managed by the operating system of the device, alone, or together with, packaging program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, item data, delivery location data, storage location data, transportation logistics data, and other data that is received by packaging program 112 from one or more sources, and data that is created by packaging program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Printing device 130 can be any device suitable for additive manufacturing of the printed package. Printing device 130 may be implemented using fuse deposition modelling, vat polymerization, material jetting, binder jetting, powder bed fusion, sheet lamination, directed energy deposition, or any other process suitable for manufacturing the optimal size and shape printed package as designed by packaging program 112. For example, printing device 130 can be a fuse deposition modelling device, such as a 3D printer. Alternatively, printing device 130 can be a stereo lithography system. In an embodiment, printing device 130 can be any additive manufacturing device capable of manufacturing the optimal package as designed by packaging program 112 and capable of communicating with computing device 110 within distributed data processing environment 100 via network 120. In an embodiment, printing device 130 may be directly connected to computing device 110. In an alternate embodiment, printing device 130 may be physically remote from computing device 110, and communicate with computing device 110 via network 120.

In an embodiment, printing device 130 can use any material applicable to additive manufacturing. The material may include, for example, ABS plastic, polylactic acid, polyamide, glass filled polyamide, epoxy resins, silver, titanium, steel, wax, photopolymers and polycarbonate.

Figure 2:
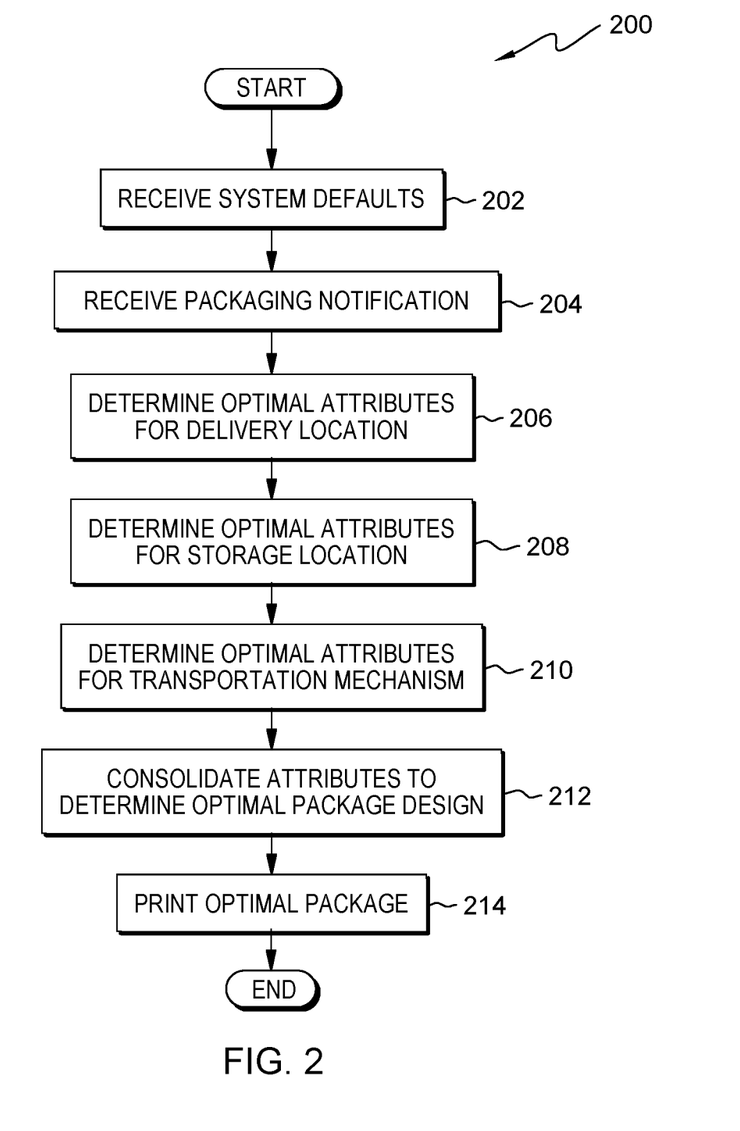
FIG. 2 is a flowchart depicting operational steps of the packaging program, on a computing device within the distributed data processing environment of FIG. 1, for determining optimal size and shape of additive manufactured packaging.

FIG. 2 is a flow chart diagram of workflow 200 depicting operational steps for packaging program 112 for determining the optimal size and shape of additive manufactured packaging in accordance with at least one embodiment of the invention. In an alternative embodiment, the steps of workflow 200 may be performed by any other program while working with packaging program 112. In an embodiment, packaging program 112 receives system defaults. In an embodiment, packaging program 112 receives a notification to design a package for a specific item. In an embodiment, packaging program 112 determines optimal design attributes for the delivery location. In an embodiment, packaging program 112 determines the optimal design attributes for the storage location. In an embodiment, packaging program 112 determines the optimal design attributes for the transportation mechanism. In an embodiment, packaging program 112 consolidates the attributes to determine the optimal package design. In an embodiment, packaging program 112 manufactures the optimal package using an additive manufacturing process.

It should be appreciated that embodiments of the present invention provide at least for determining optimal size and shape of packaging for an item that is capable of being manufactured using additive manufacturing techniques, typically by 3D printing on printing device 130. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Packaging program 112 receives system defaults (step 202). At step 202, packaging program 112 receives a set of system defaults, which may include a delivery location corpus; a storage location corpus; and a transportation mechanism corpus. In an embodiment, the delivery location corpus contains attributes about delivery locations based on previous deliveries. For example, the delivery location corpus may contain specific drop-off points for a delivery location, such as a mailbox or covered porch. In addition, the delivery location corpus may contain images and dimensions of these drop-off points. In an embodiment, the storage location corpus contains attributes about storage locations used for storage of items based on previous items. For example, the storage location corpus may contain the number, size, and arrangement of shelves within a warehouse. In an embodiment, the transportation mechanism corpus contains attributes about the delivery vehicles used by the delivery carriers. For example, the transportation mechanism corpus may contain the size and arrangement of the compartments for the delivery vehicles used by a carrier. In an embodiment, packaging program 112 receives updates from the delivery carriers when they add new vehicles to their fleets. In an embodiment, packaging program 112 updates the delivery location corpus, the storage location corpus, and the transportation mechanism corpus based on new deliveries.

Packaging program 112 receives a packaging notification (step 204). At step 204, packaging program 112 receives a notification to design a package for a specific item. In an embodiment, the notification is an order for the item to be packaged, for example, from the fulfillment center for an online retailer. In another embodiment, packaging program 112 receives a notification from a distribution center that requires a package for storage of the item. In an embodiment, packaging program 112 receives information with the notification from which to determine the optimal package design. For example, packaging program 112 may receive the delivery address for the item in order to determine the optimal package design for that specific delivery location. In another embodiment, packaging program 112 may receive storage location information with the notification, in order to determine the optimal package design based on that specific storage location. In yet another embodiment, packaging program 112 may receive delivery vehicle information with the notification, in order to determine the optimal package design based on the specific delivery vehicle. In an embodiment, packaging program 112 may receive any information with the notification that can be used to design the optimal package for the item to meet the specific requirements for that particular notification, which may be different than the packaging requirements for that same item for a different notification.

In an embodiment, the notification contains multiple items to be delivered together. For example, packaging program 112 may be notified by an order fulfillment company that three different items are to be delivered to the same location and therefore the notification designs an optimal package to contain all three items, thereby reducing the packaging cost.

Packaging program 112 determines optimal design attributes for a delivery location (step 206). In an embodiment, packaging program 112 determines the optimal design attributes for the item to be packaged for the delivery location. In an embodiment, packaging program 112 checks if an address was received with the notification and, if so, checks the address against the delivery location corpus in the system defaults. Packaging program 112 checks if the delivery location corpus contains acceptable drop-off points, for example, a mailbox or covered porch. In an embodiment, packaging program 112 determines if the delivery location corpus contains dimensions of the drop-off points. If the delivery location corpus contains dimensions of the drop-off points, packaging program 112 retrieves the dimensions of the drop-off points. If the delivery location corpus does not contain dimensions of the drop-off points, then packaging program 112 determines if the delivery location corpus contains images of the drop-off points. Packaging program 112 performs image analysis on the images to determine the dimensions of the drop-off points, for example, the dimensions of a mailbox.

In an embodiment, packaging program 112 uses convolutional neural networks for the image analysis. In another embodiment, packaging program 112 uses any image analysis algorithms as known in the art to determine the dimensions of the drop-off points. In an embodiment, packaging program 112 combines image analysis with statistical analysis to determine the optimal design of the package. For example, an apartment complex or townhouse may have small individual mailboxes for the occupants, but also have a limited number of larger package delivery boxes which are available on a first-come, first-served basis. In this example, packaging program 112 uses statistical analysis to determine the probability that a package delivery box is available and, based on the results of this analysis, uses image analysis to determine the dimensions of the box most likely to be used for the delivery.

In an embodiment, packaging program 112 determines the availability of space at the drop-off point. In an embodiment, packaging program 112 receives a notification from the delivery carrier that other packages are scheduled to be delivered to the same drop-off point. In an embodiment, the notification includes the dimensions of the other packages that are scheduled to be delivered to the same drop-off point. Packaging program 112 uses the dimensions of the other packages to determine the optimal size and shape of the package to fit at or in the drop-off point with the other packages. In an embodiment, if there are multiple drop-off points at the delivery location, packaging program 112 determines the optimal drop-off point to use and the dimensions of the space available at the optimal drop-off point based on the dimensions of the other packages that are scheduled to be delivered to the same drop-off point and the delivery location corpus. In an embodiment, packaging program 112 notifies the delivery carrier to use the optimal drop-off point.

In an embodiment, if no address was received with the notification, or if the delivery location corpus does not contain information on the delivery location, then packaging program 112 will use system defaults for the package design attributes. For example, if packaging program 112 cannot determine the attributes of the delivery location, then packaging program 112 will default to the minimum dimensional size for the optimal design attributes for delivery location. In another embodiment, if packaging program 112 cannot determine the attributes of the delivery location, then packaging program 112 will use the storage location and the transportation mechanism to determine the optimal design attributes for the package design.

Packaging program 112 determines optimal design attributes for a storage location (step 208). In step 208, packaging program 112 determines how the package will be stored at the storage location. In an embodiment, packaging program 112 determines if the storage location corpus contains dimensions of the storage location. If packaging program 112 determines that the storage location corpus contains dimensions of the storage location, then packaging program 112 uses these dimensions to determine the optimal design attributes for the storage location. In an embodiment, the notification may include images of existing items stored at the storage location. Packaging program 112 uses image analysis to determine the dimensions and shape that the optimal package would need to conform within the storage location. Packaging program 112 uses these dimensions to determine the optimal design attributes for the storage location.

Packaging program 112 determines optimal design attributes for a transportation mechanism (step 210). At step 210, packaging program 112 determines the optimal design attributes of the package for the item for transport to the delivery location based on the transportation mechanism. In an embodiment, packaging program 112 checks the transportation mechanism corpus to determine if the corpus contains the dimensions of the delivery vehicle for the transportation mechanism. In another embodiment, packaging program 112 queries the delivery carrier to determine the dimensions of the delivery vehicle. In an embodiment, packaging program 112 determines the optimal design attributes of the packaging to fit within the delivery vehicle. In an embodiment, packaging program 112 determines the optimal design attributes of the packaging to maximize the usage of space in the delivery vehicle. For example, packaging program 112 may determine to hold the item in a vertical orientation rather than a horizontal orientation to better fit the compartment in the delivery vehicle, thereby allowing the vehicle to carry more packages, and will set the optimal design attributes of the packaging for the transportation mechanism accordingly.

In an embodiment, packaging program 112 determines the optimal design attributes of the packaging based on the type of transportation. For example, if the package will be transported at some point by drone, packaging program 112 determines the optimal design attributes of the packaging for the transportation mechanism to be an aerodynamic shape. In an embodiment, if the package will be transported at some point by drone, packaging program 112 selects an appropriate material to minimize the weight of the manufactured package.

Packaging program 112 consolidates attributes to determine the optimal package design (step 212). At step 212, packaging program 112 combines the optimal design attributes from steps 206, 208, and 210, the fragileness factor for the item to be packaged, and any other factors supplied by the user, to derive the optimal package design for the item. In an embodiment, packaging program 112 applies a weighting factor to the optimal design attributes from steps 206, 208, and 210, the fragileness factor for the item to be packaged, and any other factors supplied by the user, to determine the optimal package design. For example, if the recipient has requested packaging to fit a given storage location, then the optimal attributes for the storage location is assigned the highest weight. In another example, if the delivery company has requested packaging to maximize the available space on the delivery vehicle, then packaging program 112 will assign the highest weight to the optimal attributes for the transportation mechanism. In an embodiment, if the recipient has not requested any specific delivery location or storage requirements, then packaging program 112 uses a system default and determines the optimal package design, for example, to fit the mailbox at the drop-off point. In an embodiment, packaging program 112 determines that the fragileness factor of the item is an important attribute for the package design, and sets a high weight to the fragileness factor in determining the optimal design of the package.

In an embodiment, packaging program 112 determines that the optimal design of the package is the minimum dimensional size. In another embodiment, packing program 112 determines that, based on other attributes, for example the fragileness factor, the optimal design of the package is larger than the minimum dimensional size.

In an embodiment, packaging program 112 designs the optimal size and shape package based on the combined attributes, including the optimal design attributes from steps 206, 208, and 210, the fragileness factor for the item to be packaged, and any other factors supplied by the user.

Packaging program 112 manufactures the optimal size and shape package (step 214). At step 214, packaging program 112 uses additive manufacturing processes to manufacture the optimal size and shape package. In an embodiment, packaging program 112 utilizes a 3D printer to manufacture the optimal size and shape package. In another embodiment, packaging program 112 uses a stereo lithography system to manufacture the optimal size and shape package. In yet another embodiment, packaging program 112 uses any method of additive manufacturing that is appropriate to manufacture the optimal size and shape package as determined in step 212. In an embodiment, packaging program 112 modifies the material used in the package. For example, some portions of the package may contain adhesive properties allowing them to easily stick to other packages when coupled together. This may include, for example, a pressure-sensitive adhesive or a hook-and-loop-type fastener.

Figure 3:
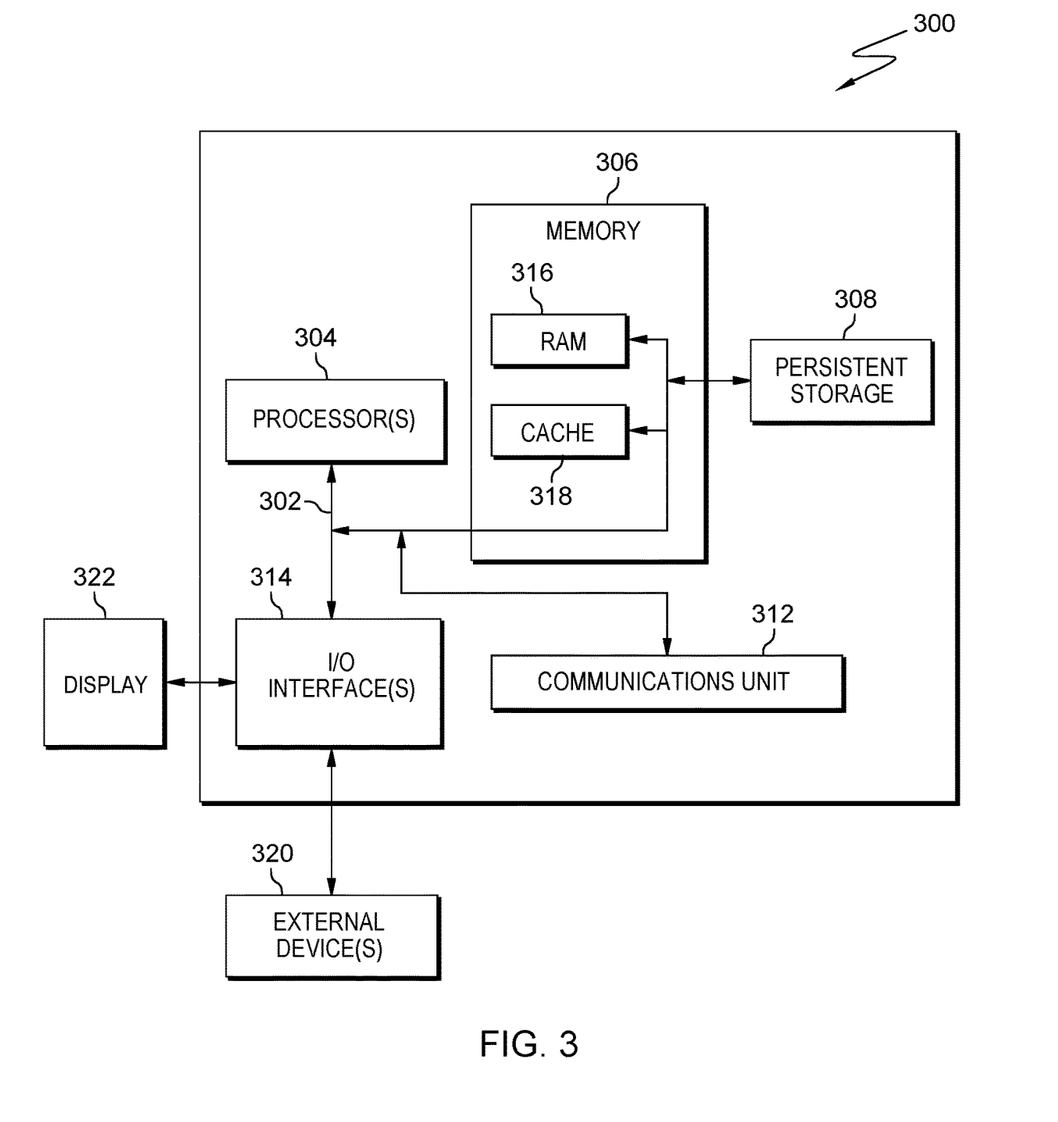
FIG. 3 depicts a block diagram of components of the computing devices executing the packaging program within the distributed data processing environment of FIG. 1, in accordance with an embodiment of the present invention.

FIG. 3 is a block diagram depicting components of computing device 110 suitable for packaging program 112, in accordance with at least one embodiment of the invention. FIG. 3 displays the computer 300, one or more processor(s) 304 (including one or more computer processors), a communications fabric 302, a memory 306 including, a random-access memory (RAM) 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with an architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a RAM 316 and a cache 318. In general, the memory 306 can include any suitable volatile or non-volatile computer readable storage media. Cache 318 is a fast memory that enhances the performance of processor(s) 304 by holding recently accessed data, and near recently accessed data, from RAM 316.

Program instructions for packaging program 112 may be stored in the persistent storage 308, or more generally, any computer readable storage media, for execution by one or more of the respective computer processors 304 via one or more memories of the memory 306. The persistent storage 308 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

The communications unit 312, in these examples, provides for communications with other data processing systems or devices. In these examples, the communications unit 312 includes one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allows for input and output of data with other devices that may be connected to computer 300. For example, the I/O interface(s) 314 may provide a connection to external device(s) 320 such as a keyboard, a keypad, a touch screen, a microphone, a digital camera, and/or some other suitable input device. External device(s) 320 can also include portable computer readable storage media such as, for example, thumb drives, portable optical or magnetic disks, and memory cards. Software and data used to practice embodiments of the present invention, e.g., packaging program 112, can be stored on such portable computer readable storage media and can be loaded onto persistent storage 308 via the I/O interface(s) 314. I/O interface(s) 314 also connect to a display 322.

Display 322 provides a mechanism to display data to a user and may be, for example, a computer monitor. Display 322 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for designing additive manufactured packaging for a printing device, the computer-implemented method comprising:
   receiving a notification to design an additive manufactured packaging for manufacture by a specified printing device, the notification including a specification for an item to be packaged, a delivery address, and a fragileness factor of the additive manufacturing packaging;
   retrieving delivery location information from a delivery location corpus stored on computer readable storage media, the delivery location information including a set of images of a drop-off point associated with the delivery address;
   performing, by a convolution neural network, analysis of the set of images retrieved from the delivery location corpus to determine dimensions of the drop-off point;
   responsive to a predicted weather event at an estimated time of delivery at the delivery address, adjusting the fragileness factor for an increased water-resistance according to rain or snow associated with the predicted weather event;
   determining a first set of optimal design attributes of the additive manufactured packaging for the estimated time of delivery to the delivery address including the determined dimensions of the drop-off point and specifying an increased density of the additive manufactured packaging to improve water-resistant characteristics based on the adjusted fragileness factor;
   creating a design for the additive manufactured packaging for manufacture by the specified printing device based on the first set of optimal design attributes and the specification for the item to be packaged; and
   printing an additive manufactured package on the specified printing device according to the design.

2. The computer-implemented method of claim 1, further comprising:
   determining a package is scheduled to be delivered to the delivery address; and
   identifying a set of dimensions of the package;
   wherein:
   creating the design for the additive manufactured packaging is further based on the set of dimensions of the package scheduled for delivery at the delivery address.

3. A computer system for designing additive manufactured packaging for a printing device, the computer system comprising:
   one or more computer processors;
   one or more computer readable storage media; and program instructions stored on the one or more computer readable storage media for execution by at least one of the one or more computer processors, the stored program instructions comprising:

program instructions to receive a notification to design an additive manufactured packaging for manufacture by a specified printing device, the notification including a specification for an item to be packaged, a delivery address, and a fragileness factor of the additive manufacturing packaging;

program instructions to retrieve delivery location information from a delivery location corpus stored on computer readable storage media, the delivery location information including a set of images of a drop-off point associated with the delivery address;

program instructions to perform, by a convolution neural network, analysis of the set of images retrieved from the delivery location corpus to determine dimensions of the drop-off point;

program instructions to, responsive to a predicted weather event at the estimated time of delivery at the delivery address, adjust the fragileness factor for an increased water-resistance according to rain or snow associated with the predicted weather event;

program instructions to determine a first set of optimal design attributes of the additive manufactured packaging for the estimated time of delivery to the delivery address including the determined dimensions of the drop-off point and specifying an increased density of the additive manufactured packaging to improve water-resistant characteristics based on the adjusted fragileness factor;

program instructions to create a design for the additive manufactured packaging for manufacture by the specified printing device based on the first set of optimal design attributes and the specification for the item to be packaged; and program instructions to print an additive manufactured package on the specified printing device according to the design.

4. The computer system of claim 3, further comprising:
program instructions to determine a package is scheduled to be delivered to the delivery address; and
identifying a set of dimensions of the package;
wherein:
creating the design for the additive manufactured packaging is further based on the set of dimensions of the package scheduled for delivery at the delivery address.

5. The computer-implemented method of claim 1, further comprising:
retrieving storage location information from computer readable storage media including a storage location corpus, the storage location information including a set of dimensions of a storage location identified in the notification for storing the item to be packaged; and
determining a second set of optimal design attributes for storing the item to be packaged in the storage location based on the storage location information.

6. The computer-implemented method of claim 1, further comprising:
retrieving transportation information from computer readable storage media including a transportation mechanism corpus, the transportation information including a description of a delivery vehicle identified in the notification for transporting the item to be packaged;

determining a second set of optimal design attributes for transporting the item to be packaged via the delivery vehicle based on the transportation information; and
consolidating the first and second set of optimal design attributes to create a final set of design attributes.

7. The computer-implemented method of claim 6, wherein:
the delivery vehicle is a drone; and
the second set of optimal design attributes are directed minimizing weight of the additive manufactured packaging.

8. The computer-implemented method of claim 1, wherein the specification for an item to be packaged includes multiple items to be packaged together.

9. The computer system of claim 3, further comprising:
program instructions to retrieve storage location information from computer readable storage media including a storage location corpus, the storage location information including a set of dimensions of a storage location identified in the notification for storing the item to be packaged; and
program instructions to determine a second set of optimal design attributes for storing the item to be packaged in the storage location based on the storage location information.

10. The computer system of claim 9, wherein creating a design for the additive manufactured packaging includes:
program instructions to receive, with the notification, a first weighting factor for the first set of optimal design attributes for the delivery location and a second weighting factor for the second set of optimal design attributes for storing the item, the higher weighting factor establishing a set of priority design attributes; and
wherein:
creating the design is further based on the set of priority design attributes.

11. The computer system of claim 9, further comprising:
program instructions to retrieve transportation information from computer readable storage media including a transportation mechanism corpus, the transportation information including a description of a delivery vehicle identified in the notification for transporting the item to be packaged;
program instructions to determine a third set of optimal design attributes for transporting the item to be packaged via the delivery vehicle based on the transportation information; and
program instructions to consolidate the first, second, and third set of optimal design attributes to create a final set of design attributes.

12. A computer program product for designing additive manufactured packaging for a printing device, the computer program product comprising:
a non-transitory computer readable storage medium and program instructions stored on the computer readable storage medium, the stored program instructions comprising:
program instructions to receive a notification to design an additive manufactured packaging for manufacture by a specified printing device, the notification including a specification for an item to be packaged, a delivery address, and a fragileness factor of the additive manufacturing packaging;
program instructions to retrieve delivery location information from a delivery location corpus stored on computer readable storage media, the delivery location information including a set of images of a drop-off point associated with the delivery address;

program instructions to perform, by a convolution neural network, analysis of the set of images retrieved from the delivery location corpus to determine dimensions of the drop-off point;

program instructions to, responsive to a predicted weather event at the estimated time of delivery, adjust the fragileness factor for an increased water-resistance according to rain or snow associated with the predicted weather event;

program instructions to determine a first set of optimal design attributes of the additive manufactured packaging for the estimated time of delivery to the delivery address including the determined dimensions of the drop-off point and specifying an increased density of the additive manufactured packaging to improve water-resistant characteristics based on the adjusted fragileness factor;

program instructions to create a design for the additive manufactured packaging for manufacture by the specified printing device based on the first set of optimal design attributes and the specification for the item to be packaged; and program instructions to print an additive manufactured package on the specified printing device according to the design.

13. The computer program product of claim 12, further comprising:
program instructions to determine a package is scheduled to be delivered to the delivery address; and
identifying a set of dimensions of the package;
wherein:
creating the design for the additive manufactured packaging is further based on the set of dimensions of the package scheduled for delivery at the delivery address.

14. The computer program product of claim 12, further comprising:
program instructions to retrieve storage location information from a second non-transitory computer readable storage media including a storage location corpus, the storage location information including a set of dimensions of a storage location identified in the notification for storing the item to be packaged; and
program instructions to determine a second set of optimal design attributes for storing the item to be packaged in the storage location based on the storage location information.

15. The computer program product of claim 14, wherein creating a design for the additive manufactured packaging includes:
program instructions to receive, with the notification, a first weighting factor for the first set of optimal design attributes for the delivery location and a second weighting factor for the second set of optimal design attributes for storing the item, the higher weighting factor establishing a set of priority design attributes; and
wherein:
creating the design is further based on the set of priority design attributes.

16. The computer program product of claim 14, further comprising:
program instructions to retrieve transportation information from at least one of the second non-transitory computer readable storage media or a third non-transitory computer readable storage media including a transportation mechanism corpus, the transportation information including a description of a delivery vehicle identified in the notification for transporting the item to be packaged;
program instructions to determine a third set of optimal design attributes for transporting the item to be packaged via the delivery vehicle based on the transportation information; and
program instructions to consolidate the first, second, and third set of optimal design attributes to create a final set of design attributes.

17. The computer program product of claim 12, wherein the specification for an item to be packaged includes multiple items to be packaged together.

18. The computer implemented method of claim 5, wherein creating the design for the additive manufacturing packaging includes:
receiving, with the notification, a first weighting factor for the first set of optimal design attributes for the delivery location and a second weighting factor for the second set of optimal design attributes for storing the item, the higher weighting factor establishing a set of priority design attributes; and
wherein:
creating the design is further based on the set of priority design attributes.

19. The computer system of claim 3, wherein the specification for an item to be packaged includes multiple items to be packaged together.

* * * * *